(12) United States Patent
Verduzco et al.

(10) Patent No.: US 9,524,489 B2
(45) Date of Patent: Dec. 20, 2016

(54) COMPUTING SYSTEM WITH TASK TRANSFER MECHANISM AND METHOD OF OPERATION THEREOF

(71) Applicant: Samsung Electronics Co., Ltd., Gyeonggi-Do (KR)

(72) Inventors: Mario A Garcia Verduzco, San Ramon, CA (US); James M. A. Begole, Los Altos, CA (US); Stacie Hibino, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 285 days.

(21) Appl. No.: 13/804,059

(22) Filed: Mar. 14, 2013

(65) Prior Publication Data
US 2014/0282559 A1 Sep. 18, 2014

(51) Int. Cl.
*G06F 9/46* (2006.01)
*G06Q 10/10* (2012.01)

(52) U.S. Cl.
CPC .................................. *G06Q 10/10* (2013.01)

(58) Field of Classification Search
None
See application file for complete search history.

(56) References Cited

U.S. PATENT DOCUMENTS

| | | |
|---|---|---|
| 5,874,988 A | 2/1999 | Gu |
| 6,058,208 A | 5/2000 | Ikeda et al. |
| 6,313,823 B1 | 11/2001 | Cappels et al. |
| 7,102,648 B1 | 9/2006 | Holub |
| 7,957,518 B2 | 6/2011 | Erb |
| 8,171,137 B1* | 5/2012 | Parks et al. .................... 709/224 |
| 2003/0149643 A1 | 8/2003 | Aoki et al. |
| 2004/0044721 A1* | 3/2004 | Song et al. .................... 709/202 |
| 2007/0016553 A1 | 1/2007 | Dumais et al. |
| 2007/0239726 A1 | 10/2007 | Weiss et al. |
| 2011/0243435 A1 | 10/2011 | Lee et al. |
| 2012/0005224 A1 | 1/2012 | Ahrens et al. |
| 2012/0203862 A1* | 8/2012 | Tayeb et al. .................. 709/217 |
| 2013/0120656 A1 | 5/2013 | Wilson et al. |

(Continued)

FOREIGN PATENT DOCUMENTS

JP 2005509953 A 4/2005

OTHER PUBLICATIONS

Amazon.com, "Wireless, Whispernet, and Whispersync", http://www.amazon.com/gp/help/customer/display.html?nodeId=200375890, Mar. 8, 2013.

(Continued)

*Primary Examiner* — Dong Kim
(74) *Attorney, Agent, or Firm* — IP Investment Law Group

(57) ABSTRACT

A computing system includes: a status module configured to determine a process profile for capturing a pause point in processing a task; a content module, coupled to the status module, configured to identify a process content for capturing the pause point; an upload module, coupled to the content module, configured to store the process profile and the process content; and a trigger synthesis module, coupled to the upload module, configured to generate a resumption-trigger with a control unit when storing the process profile and the process content for resuming the task from the pause point and for displaying on a device.

20 Claims, 8 Drawing Sheets

(56) References Cited

U.S. PATENT DOCUMENTS

2013/0254897 A1* 9/2013 Reedy et al. .................. 726/26
2014/0095624 A1* 4/2014 Quan ............................ 709/205

OTHER PUBLICATIONS

Google.com, "Why sign in to Chrome", http://support.google.com/chrome/bin/answer.py?hl=en&answer=165139, Mar. 8, 2013.
Yahoo.com, "Yahoo! Axis", http://axis.yahoo.com/, Mar. 8, 2013.
Nacsa Sandor, "Windows 8 Metro style Apps + initial dev reactions", wordpress.com, http://lazure2.wordpress.com/2011/09/15/windows-8-metro-style-apps-initial-dev-reactions/, Sep. 15, 2011.
Yunsang Han et al: "A Simple and Efficient Color Recovering System for Content Sharing Website", Jun. 29, 2010, Retrieved from the Internet: "http://ieeexplore.ieee.org/ielx5/30/5505923/05506013.pdf?tp=&arnumber=5506013&isnumber=5505923".

\* cited by examiner

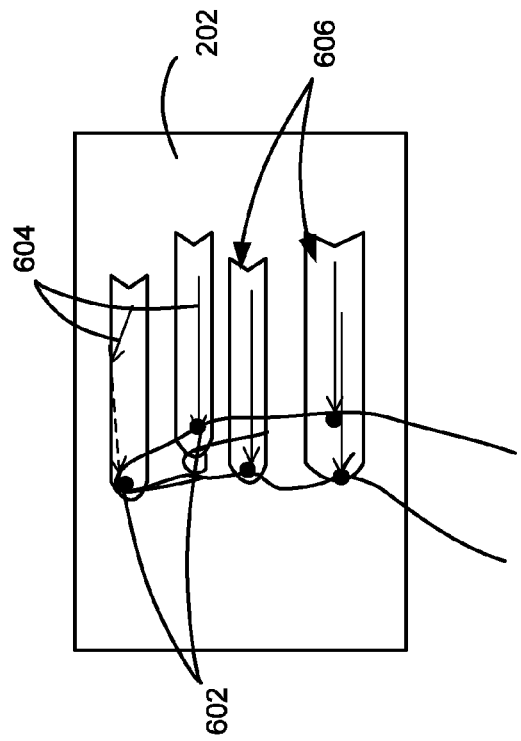
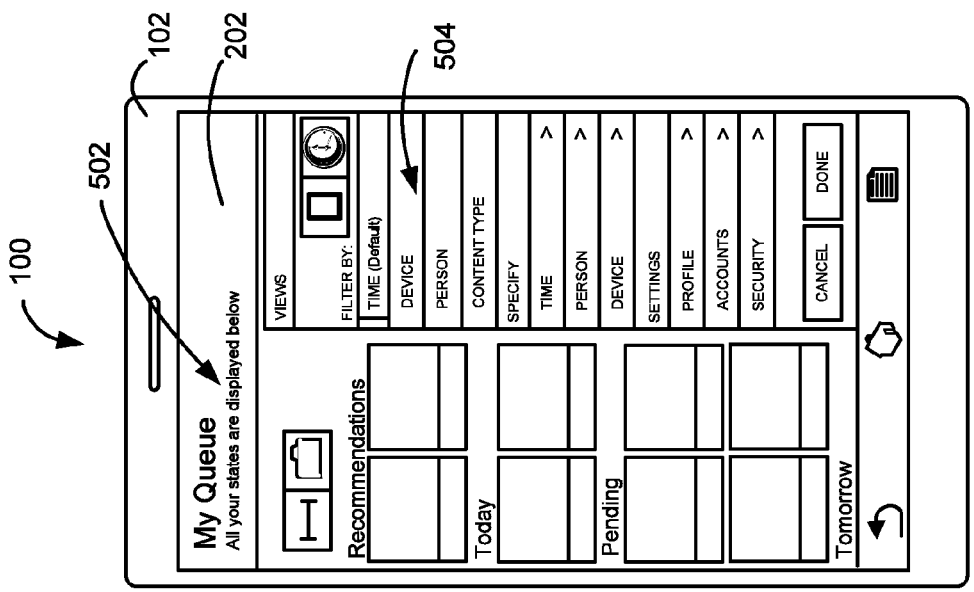
FIG. 6
FIG. 5

COMPUTING SYSTEM WITH TASK TRANSFER MECHANISM AND METHOD OF OPERATION THEREOF

TECHNICAL FIELD

An embodiment of the present invention relates generally to a computing system, and more particularly to a system for transferring tasks.

BACKGROUND

Modern consumer and industrial electronics, especially devices such as computer systems, televisions, projectors, cellular phones, portable digital assistants, and combination devices, are providing increasing levels of functionality to support modern life including supporting user tasks. Research and development in the existing technologies can take a myriad of different directions.

The increasing demand for information in modern life requires users to access information at any time, while variety of consumer devices allow for increased functionalities. However, the interactions between the consumer devices have been limited and difficult for the user to fully utilize.

Thus, a need still remains for a computing system with task transfer mechanism for improving transfer of information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a status module configured to determine a process profile for capturing a pause point in processing a task; a content module, coupled to the status module, configured to identify a process content for capturing the pause point; an upload module, coupled to the content module, configured to store the process profile and the process content; and a trigger synthesis module, coupled to the upload module, configured to generate a resumption-trigger with a control unit when storing the process profile and the process content for resuming the task from the pause point and for displaying on a device.

An embodiment of the present invention provides a method of operation of a computing system including: determining a process profile for capturing a pause point in processing a task; identifying a process content for capturing the pause point; storing the process profile and the process content; and generating a resumption-trigger with a control unit when storing the process profile and the process content for resuming the task from the pause point and for displaying on a device.

An embodiment of the present invention provides non-transitory computer readable medium including: determining a process profile for capturing a pause point in processing a task; identifying a process content for capturing the pause point; storing the process profile and the process content; and generating a resumption-trigger with a control unit when storing the process profile and the process content for resuming the task from the pause point and for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 5 is a further example of the display interface.

FIG. 6 is a further example of the display interface.

DETAILED DESCRIPTION

Figure 1:
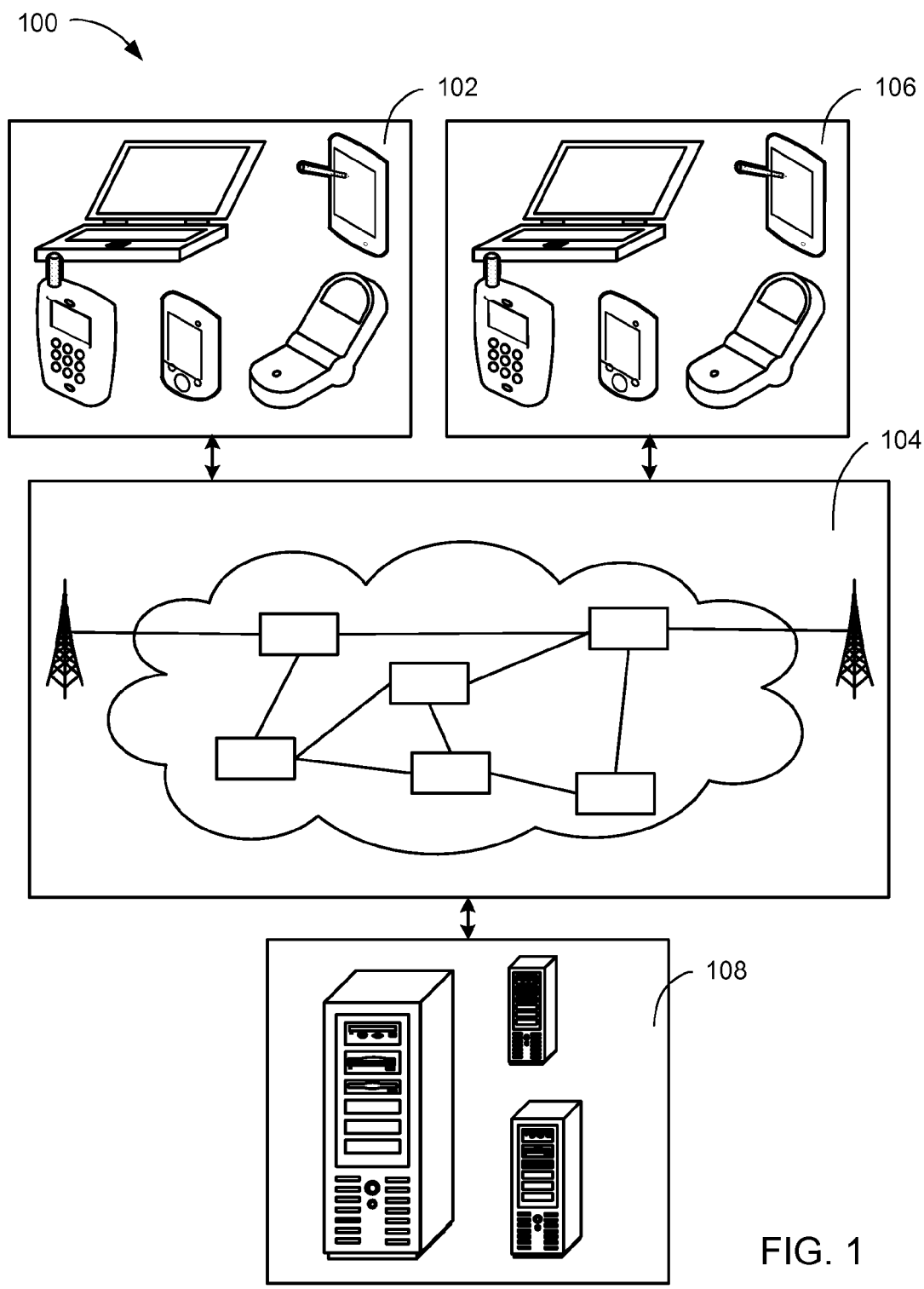
FIG. 1 is a computing system with task transfer mechanism in an embodiment of the present invention.

The following embodiment can be used to pause and continue a task at a later time, using a different device, or a combination thereof. Process for pausing the task can be initiated using an upload-trigger and process. A pause point for characterizing a progress of the task can be captured and stored, transferred, or a combination thereof using a process profile and the process content.

In the following embodiment, for example, a resumption-trigger for controlling a condition, a situation, or a combination thereof for continuing the task can be generated contemporaneously with capture and store, transfer, or a combination thereof regarding the pause point. The task can be further displayed, organized, searched for, ordered, filtered, scheduled, or a combination thereof using a task queue. The task can resume based on the task queue, resume when a situation, a condition, or a combination thereof matches the resumption-trigger, or a combination thereof.

In the following embodiment, for example, the process profile, the process content, the task-share group, and the transfer trigger can allow for seamless integration between multiple users, multiple devices, or a combination thereof. The task-share group can allow access to a group of people specified therein while the process profile, the process content, and the transfer trigger allow for access, continuation, and update of the task from any device allowed by the transfer trigger.

Also, the task queue can provide ability to track daily activity and manage unfinished activity for the user. The task queue can track when the task was last accessed and paused and show the user where the user stopped during the previous session regardless of which device the user is currently accessing or previously used to perform a portion of the task. The task queue can be further used to schedule, search for, filter, or a combination of processes thereof for unfinished instances of the task.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. Where the embodiments have been numbered first embodiment, second embodiment, etc., the ordinal numbering is a matter of descriptive convenience and is not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with task transfer mechanism in an embodiment of the present invention. The computing system 100 includes a first device 102, such as a client or a server, connected to a second device 106, such as a client or server. The computing system 100 can further include a host device 108, such as a client or a server, connected to the first device 102, the second device 106, or a combination thereof. The first device 102, the second device 106, the host device 108, or a combination thereof can communicate using a communication path 104, such as a wireless or wired network.

For example, the first device 102, the second device 106, or a combination thereof can be of any of a variety of devices, such as a cellular phone, personal digital assistant, a notebook computer, automotive telematics navigation system, or other multi-functional mobile communication or entertainment device. The first device 102, the second device 106, or a combination thereof can couple, either directly or indirectly, to the communication path 104 to communicate with each other, the host device 108, or a combination thereof or can be a stand-alone devices. The first device 102, the second device 106, or a combination thereof can also be stand-alone devices.

For illustrative purposes, the computing system 100 is described with the first device 102 as a portable computing device, although it is understood that the first device 102 can be different types of devices. For example, the first device 102 can also be a server or a device for presenting images or a multi-media presentation. A multi-media presentation can be a presentation including sound, a sequence of streaming images or a video feed, or a combination thereof. As an example, the first device 102 can be a high definition or three dimensional television, a computer monitor, or a multimedia set.

Also for illustrative purposes, the computing system 100 is described with the second device 106 as a non-mobile computing device, although it is understood that the second device 106 can be different types of devices. For example, the second device 106 can also be a server or a portable computing device, such as a laptop computer, a smart phone, or a tablet computer.

The host device 108 can be any of a variety of centralized or decentralized computing devices, or video transmission devices. For example, the host device 108 can be a multimedia computer, a laptop computer, a desktop computer, a video game console, grid-computing resources, a virtualized computer resource, cloud computing resource, routers, switches, peer-to-peer distributed computing devices, or a combination thereof.

The host device 108 can be centralized in a single room, distributed across different rooms, distributed across different geographical locations, embedded within a telecommunications network. The host device 108 can couple with the communication path 104 to communicate with the first device 102, the second device 106, or a combination thereof. The host device 108 can also be a client type device as described for the first device 102.

For illustrative purposes, the computing system 100 is described with the host device 108 as a computing device, although it is understood that the host device 108 can be different types of devices. Also for illustrative purposes, the computing system 100 is shown with the first device 102, the second device 106, and the host device 108 as end points of the communication path 104, although it is understood that the computing system 100 can have a different partition between the first device 102, the second device 106, the host device 108, and the communication path 104. For example, the first device 102, the second device 106, the host device 108, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, near field communication (NFC), Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
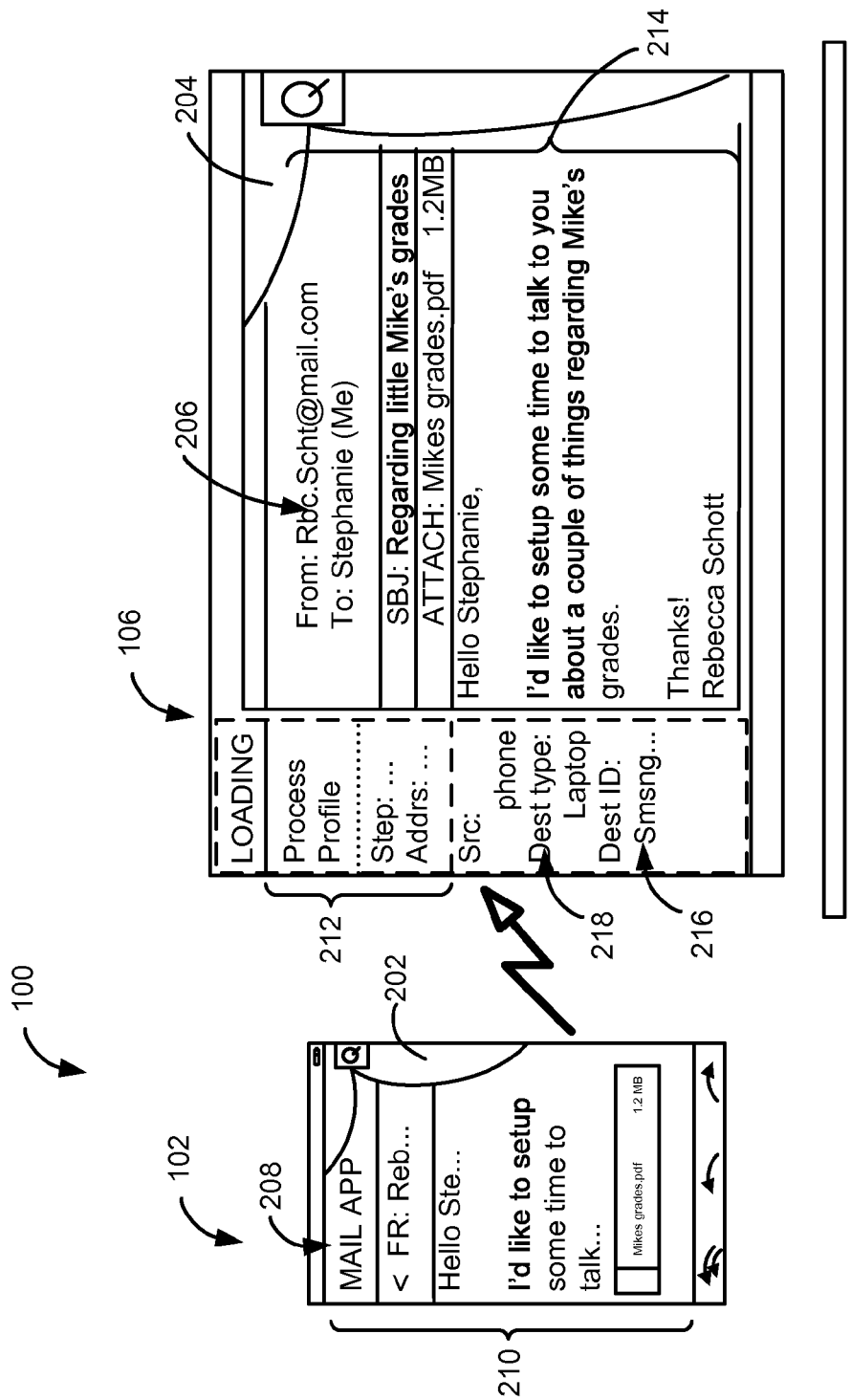
FIG. 2 is an example of a display interface of the first device and a further display of the second device.

Referring now to FIG. 2, therein is shown an example of a display interface 202 of the first device 102 and a further display 204 of the second device 106. The display interface 202, the further display 204, or a combination thereof can show a task 206. The task 206 is a piece of work or activity that is or is scheduled to be undertaken or attempted by a user (not shown). The task 206 can be a variety of activities involving the computing system 100. For example, the task 206 can include accessing or sending email, watching a video clip, taking or viewing a photograph, make a phone call, accessing stored data, browsing the internet, searching for new data, creating or editing a document, executing a software executable, or a combination thereof.

The user can use the first device 102, the second device 106, the host device 108 of FIG. 1, or a combination thereof to perform the task 206. For example, the user can access an application 208 stored on the first device 102, the second device 106, the host device 108 of FIG. 1, or a combination thereof to perform the task 206.

The application 208 is an individual set of instructions, each set for performing a specific action. The application 208 can be used to realize or complete the task 206 or a portion thereof. The application 208 can be a software application or an executable file, a hardware accelerator, a hardware device, or a combination thereof. The application 208 can be used to process input, output, and intermediate data for completing the task 206 or a portion thereof.

The display interface 202 can show a pause point 210. The pause point 210 is a status or a progress state in performing the task 206. The pause point 210 can be between start and completion of the task 206. The pause point 210 can be a relative portion or state of the application 208 where the user stopped performing the task 206 with intention to resume at a later time, on a different device, or a combination thereof.

The pause point 210 can be represented by process, data, or a combination thereof associated with the application 208 for performing the task 206. The pause point 210 can be the process, the data associated with the application 208 when the user or the computing system 100 determines that the task 206 will be temporarily stopped.

The computing system 100 can capture the pause point 210 using a process profile 212, a process content 214, or a combination thereof. The process profile 212 is a description of a status, location, or a combination thereof associated with performance of the task 206.

For example, the process profile 212 can include identification of instruction or step, location of memory having the ongoing or previously ongoing process, a specific screen or webpage being accessed or displayed by the application 208. Also for example, the process profile 212 can include locations of memory corresponding to address or location of input data, global variable, local variable, output data, intermediate data, or a combination thereof associated with the processes or instances of the application 208 executing at the pause point 210.

The process content 214 is the input, output, or intermediate data relevant to the task 206. The process content 214 can be the input data, the output data, the intermediate data, a value of the global or local variable, or a combination thereof associated with the processes or instances of the application 208 executing at the pause point 210. The process content 214 can be the instance of the data or the value located at portions included in the process profile 212.

For example, the user can open an email application on the user's smartphone. The computing system 100 can recognize that a bigger display, a more accessible input device, or a combination thereof may be available and appropriate based on the number of emails in the inbox, the subject heading, other conditions or situations present at the moment, such as content available for access to or type of other available devices, or a combination thereof. The computing system 100 can capture the pause point 210 on the smartphone and recreate the pause point 210 on the user's laptop to allow the user to continue the task 206 on the laptop.

Continuing with the example, the computing system 100 can determine the process profile 212 to include identification or location of ongoing instruction steps, server address, current status of the emails, address of memory storing personal display preferences, or a combination thereof relevant to the task 206 of accessing emails on the first device 102. The values corresponding to the process profile 212 can include the instruction steps, key or session identification relevant to connection with the server, the status values corresponding to available emails, the contents of the emails, the personal display settings, or a combination thereof.

The computing system 100 can enable the user to start, continue, or finish the task 206 using multiple devices thereof. The computing system 100 can enable the user to continue or finish the task 206 at a later time. Details for capturing the pause point 210 and for pausing and continuing the task 206 will be discussed below.

The display interface 202, the further display 204, or a combination thereof can display an available-device identification 216, an available-device type 218, or a combination thereof. The available-device identification 216 can be a letter, a number, a symbol, or a combination thereof that can be used to recognize a specific device. For example, the available-device identification 216 can be a product name, a serial number, a user designated name, or a combination thereof.

The available-device type 218 can be a categorization for a device. The available-device type 218 can be based on capabilities, features, components, or a combination thereof for the device.

For example, the available-device type 218 can be desktop, server, smart phone, tablet, laptop, television, or any other classification for the device meeting a qualification, such as security features or ownership. Also for example, the available-device type 218 can include components or features of the device, including a specification of a display interface therein, such as high-definition (HD) display or 32 inch display, available input mechanism, such as a touch screen or keyboard, processing class, such as multiple cores or business class machine, or a combination thereof.

Figure 3:
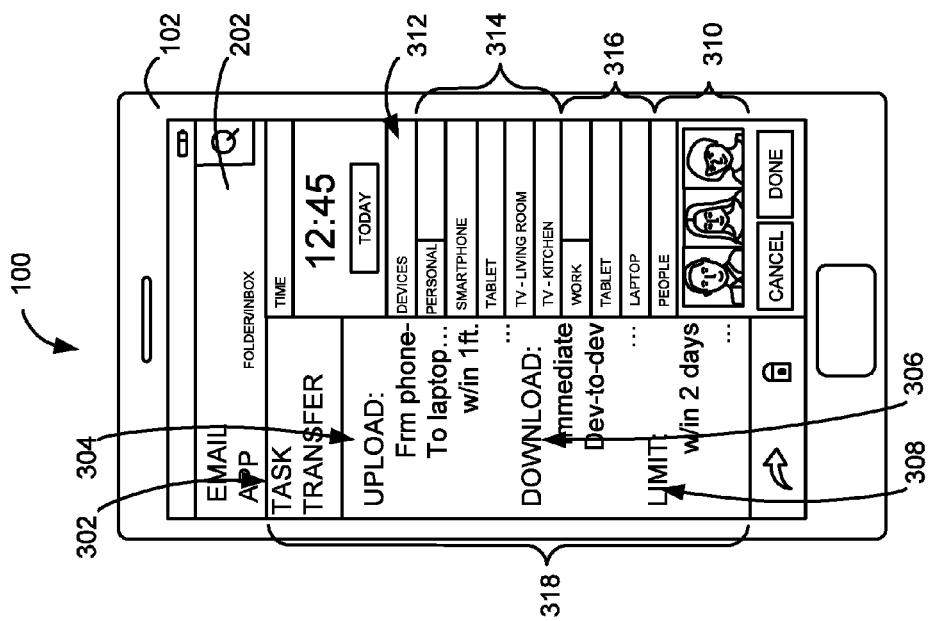
FIG. 3 is a further example of the display interface.

Referring now to FIG. 3, therein is shown a further example of the display interface 202. The display interface 202 can show a transfer trigger 302. The transfer trigger 302 is a condition, a situation, or a combination thereof for initiating a change in state for performance of the task 206 of FIG. 2, such as pausing or resuming the task 206. The transfer trigger 302 can include various aspects of surrounding factors or situations for pausing, continuing, or a combination of actions thereof using various devices of the computing system 100.

The transfer trigger 302 can include an upload-trigger 304, a resumption-trigger 306, a trigger-limitation 308, a task-share group 310, or a combination thereof for controlling the performance of the task 206. The upload-trigger 304 is a condition, a situation, or a combination thereof that controls stopping or pausing the performance of the task 206 and storing the data associated with the performance of the task 206.

For example, the upload-trigger 304 can include of any instance of the application 208 of FIG. 2 requiring user to type on average over 10 words on the first device 102, availability of the second device 106 of FIG. 1 having a keyboard and a screen bigger than the first device 102, proximity between devices, or a combination thereof as necessary conditions for pausing performance of the task 206. The upload-trigger 304 can further include instructions to store information regarding the task 206, the application 208, such as the process profile 212 of FIG. 2 or the process content 214 of FIG. 2, or a combination thereof on the first device 102, the second device 106, the host device 108 of FIG. 1, or a combination thereof.

The resumption-trigger 306 is a condition, a situation, or a combination thereof for controlling continuation of processing for the task 206. The resumption-trigger 306 can cause the computing system 100 to access the stored data and allow the devices of the computing system 100 to further process the accessed data. The resumption-trigger 306 can follow the upload-trigger 304.

For example, the upload-trigger 304 can limit a duration of access for the first device 102 with graphic related applications due to strain on the user's eyes or battery limitations of the first device 102. The resumption-trigger 306 can be availability of the second device 106 having larger screen therein or longer battery life.

The resumption-trigger 306 can include instructions to access relevant stored information regarding the task 206, the application 208, such as the process profile 212 or the process content 214, or a combination thereof on the first device 102, the second device 106, the host device 108, or a combination thereof. The resumption-trigger 306 can further include instructions for restoring the pause point 210 of FIG. 2 for resuming the performance of the task 206.

The trigger-limitation 308 is a condition, a situation, duration or a combination thereof that controls the transfer trigger 302. The trigger-limitation 308 can be a boundary for the transfer trigger 302. For example, the trigger-limitation 308 can be a duration left for a temporary license status for the application 208, the number of remaining days of access to the application 208 allotted to the user, priority level, user's schedule, deadlines, or a combination thereof. The trigger-limitation 308 can be used to adjust the upload-trigger 304, the resumption-trigger 306, or a combination thereof.

The task-share group 310 is a person, an entity, or a combination thereof that can access the task 206. For example, the task-share group 310 can be a person, such as a relative or a coworker, an entity, such as a company or a social group, or a combination thereof that can pause, continue, alter, delete or a combination of operations regarding a progress of the task 206.

It has been discovered that the task-share group 310, the transfer trigger 302, the process profile 212, and the process content 214 provide accessibility and tracking to a group of people over multiple devices. The task-share group 310 can be used to allow access to the task 206 to the people identified therein while the transfer trigger 302, the process profile 212, and the process content 214 can accurately track the latest progress and enable continuation of the task 206 using any device allowed by the transfer trigger 302.

The computing system 100 can determine the transfer trigger 302 using a selection from a device-set 312. The device-set 312 can be a collection of devices in the computing system 100 available for performing the task 206 or a portion thereof. The device-set 312 can include the first device 102, the second device 106, the host device 108, any other devices belonging to or accessible by the user or the task-share group 310, or a combination thereof.

The device-set 312 can include a personal device-group 314, a general device-group 316, or a combination thereof. The personal device-group 314 is a collection of devices for which the user has exclusive control for accessing the collection of devices. The personal device-group 314 can be a collection of devices that the user owns.

The general device-group 316 is a collection of devices for which the user does not have exclusive control for accessing the collection of devices. The general device-group 316 can be a collection of devices that the user may access but does not have authority to exclude access by others.

The display interface 202 can display a trigger designation panel 318 for determining the transfer trigger 302. The trigger designation panel 318 is an interface for user interaction for determining the details of the transfer trigger 302 or components therein.

For example, the computing system 100 can use the trigger designation panel 318 to receive selections from the device-set 312, available contacts, situational limitations or conditional limitations, contextual limitations, command definitions or descriptions, or a combination thereof. The computing system 100 can determine the transfer trigger 302 or the components therein, such as the upload-trigger 304 or the resumption-trigger 306, based on the selections received using the trigger designation panel 318. Details regarding determination of the transfer trigger 302 will be described below.

Figure 4:
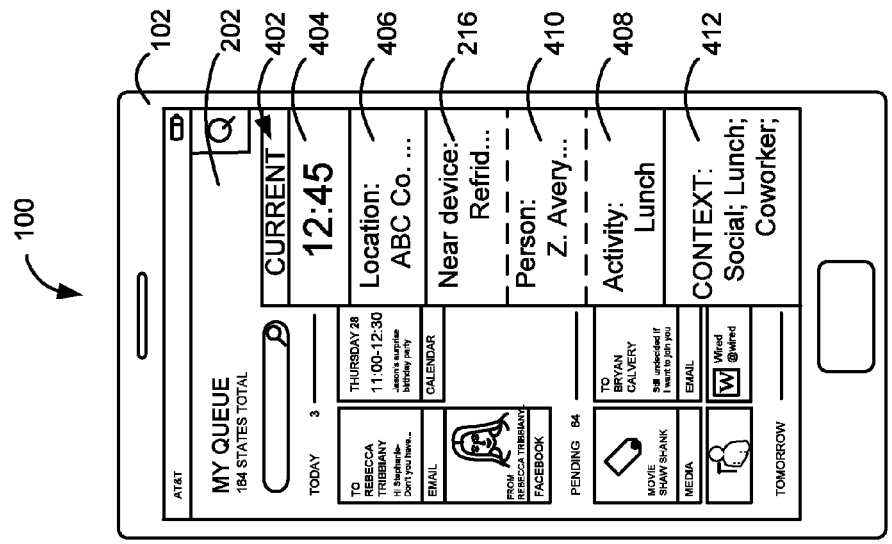
FIG. 4 is a further example of the display interface.

Referring now to FIG. 4, therein is shown a further example of the display interface 202. The display interface 202 can show a current observation 402. The current observation 402 is a condition or an environmental factor determined by the computing system 100. The current observation 402 can be parameters detected or identified by the computing system 100 that represent characteristics of the user at present time or represent situations or conditions associated with the user at the present time. The current observation 402 can include movement directions or patterns of the user, such as involving user's torso or hand, inputs or interactions from the user, images of surrounding environment, data from other devices, such as location or identification information, or a combination thereof.

The current observation 402 can further include a current time 404, a current location 406, an activity type 408, an activity participant 410, or a combination thereof. The current time 404 can be represented using time of day, date, week, month, year, or a combination thereof.

The current location 406 can be the location of the first device 102, the second device 106 of FIG. 1, the host device 108 of FIG. 1, or a combination thereof. The current location 406 can represent geographic location of the user using the first device 102, the second device 106, the host device 108, or a combination thereof. The current location 406 can be presented in the format of (X, Y) or (X, Y, Z), where X, Y, and Z are coordinates that define the geographic location. For example, the current location 406 can be global position system (GPS) coordinates or latitude and longitude coordinates.

The activity type 408 is a categorization of an activity associated with the user, the task 206 of FIG. 2, or a combination thereof. The activity type 408 can be a description of user's activity, motivation, purpose, or a combination thereof for a currently-engaged activity of the user, the task 206, or a combination thereof. For example, the user's schedule or calendar may have the activity scheduled at the current time 404 with the activity type 408 of "lunch". Also for example, an activity the user engages in at a location identified as "home" and after work hours can have the activity type 408 of "personal".

The activity participant 410 is a person or people associated with the task 206 based on the context 412. Continuing with the example, the activity participant 410 can be anyone that will be accompanying the user for the lunch or a family member partaking in the activity at home. The computing system 100 can determine the activity participant 410 based on user's personal information, such as through social media connections, emails, personal profiles, account information, or a combination thereof.

The computing system 100 can also determine the activity participant 410 based on detecting devices within a set distance predetermined by the computing system 100, using a communication protocol, duration of the proximity between devices, ownership or identification of the device, a contextual determination, or a combination thereof. The current observation 402 can further include the available-device identification 216 of FIG. 2, the available-device type 218 of FIG. 2, or a combination thereof for the device detected within the set distance.

The computing system 100 can use the current observation 402 to determine a context 412. The context 412 is an abstract categorization for a set of facts or circumstances that are associated with the user, the task 206, or a combination thereof. The context 412 can further include inferences for the user and abstractions for the current observation 402.

For example, the context 412 can be a categorization of "home" or "work" for a location, "family" or "colleague" for a contact, "professional" or "leisure" for an activity, or any other categorization for any aspect of the user. Also for example, the context 412 can be categorization of "social", "meal", "coworker", or a combination thereof based on the current observation 402, user's previous behavior, user's social connection, such as determined by user's profile or social networking data, or a combination thereof.

Referring now to FIG. 5, therein is shown a further example of the display interface 202. The display interface 202 can show a task queue 502 and a queue-configuration panel 504. The task queue 502 is a set of processes to be done by the computing system 100. The task queue 502 can be an organizing repository of captured states. The computing system 100 can use the task queue 502 to store and manage information regarding the task 206 of FIG. 2 and schedule performance of the task 206. The task queue 502 can further include the process profile 212 of FIG. 2, the process content 214 of FIG. 2, or a combination thereof.

The task queue 502 can arrange and display contents therein. For example, the task queue 502 can display instances of the task 206 that is indicated as requiring more processing based on the transfer trigger 302 of FIG. 3, days of the week, time of day, priority or importance as determined by the computing system 100, ordering or recommendation determined by the computing system 100, or a combination thereof. The task queue 502 can be used to schedule or arrange performance or continuation of the task 206.

The task queue 502 can use various visual indicators to communicate, accessibility based on situational or conditional limitation, categorization for the task 206 or the transfer trigger 302 associated the task 206, various information regarding the content therein, such as priority, accessibility by user or device, or a combination thereof. The task queue 502 can use labels, ordering, colors, image intensity, such as by dimming or sharpening the definition, or a combination thereof to communicate information regarding the content therein.

The queue-configuration panel 504 is an interface for determining display or organization of the task queue 502. The queue-configuration panel 504 can be used to interact with the user and receive selections for displaying or organizing the instances of the task 206 for the task queue 502.

The queue-configuration panel 504 can display or organize the instances of the task 206 based on scheduled time or previously logged time for pausing or continuing the task 206, based on previously used device or device designated and scheduled for use, person previously accessing the task 206 or scheduled to continue the task 206, a categorization of the process content 214, or a combination thereof. The queue-configuration panel 504 can further use profiles for the user, the task 206, or a combination thereof, security levels for the task 206, the user, the task-share group 310 of FIG. 3, or a combination thereof.

The queue-configuration panel 504 can further be used by the user to search for a specific instance of the task 206 based on various parameters as listed above. The queue-configuration panel 504 can further be used by the user to filter instance of the task 206 on the task queue 502 based on various parameters as listed above.

Referring now to FIG. 6, therein is shown a further example of the display interface 202. The display interface 202 can display a recognition marker 602, a movement pattern 604, and a command-motion profile 606. The recognition marker 602 can be physical features of the user as predefined by the computing system 100. For example, the recognition marker 602 can be a pattern of pixels corresponding to a finger, a hand, an arm, an eye, a nose, lips, a face, a shoulder, hips, any physical feature of the user, any portion or orientation thereof, or a combination thereof.

The movement pattern 604 can be a set of locations for the recognition marker 602 over a period of time. The movement pattern 604 can represent a motion or movement of the user for specifying a command.

The command-motion profile 606 can be a threshold, a range, a duration, or a combination thereof defining specified user input command. The command-motion profile 606 can correspond to the user's physical movement and interaction with the computing system 100. The command-motion profile 606 can be used to enable a user to provide input and issue commands for using functions of the computing system 100, such as pause and upload or download and continue the task 206 of FIG. 2, using physical movements, without contacting a mouse, a keyboard, a touch screen, or a combination thereof, and without typing.

For example, the command-motion profile 606 can include instances of the recognition marker 602 representing a user's hand oriented in a thumb-up direction orthogonal to the display interface 202. The command-motion profile 606 can include the movement pattern 604 for the instances of the recognition marker 602 moving within a set of ranges in a right-to-left direction. The command-motion profile 606 can have the patterns for the instances of the recognition marker 602, the ranges and direction for the movement pattern 604, or a combination thereof corresponding to a command to pause the task 206 and store the pause point 210 of FIG. 2 for continuing the task 206 at a later time, on a different device, or a combination thereof.

Also for example, the command-motion profile 606 can include the recognition marker 602, the movement pattern 604, patterns or sequences thereof, or a combination thereof corresponding to user's finger tapping on a device in the computing system 100, pressing and holding for a duration, or a combination thereof. The computing system 100 can associate tapping motion on a displayed queue tab as a command to pause the task 206 and capture the pause point 210. The computing system 100 can associate pressing and holding to initiate pausing for the task 206, capturing the pause point 210, displaying the trigger designation panel 318 of FIG. 3, or a combination thereof.

Figure 7:
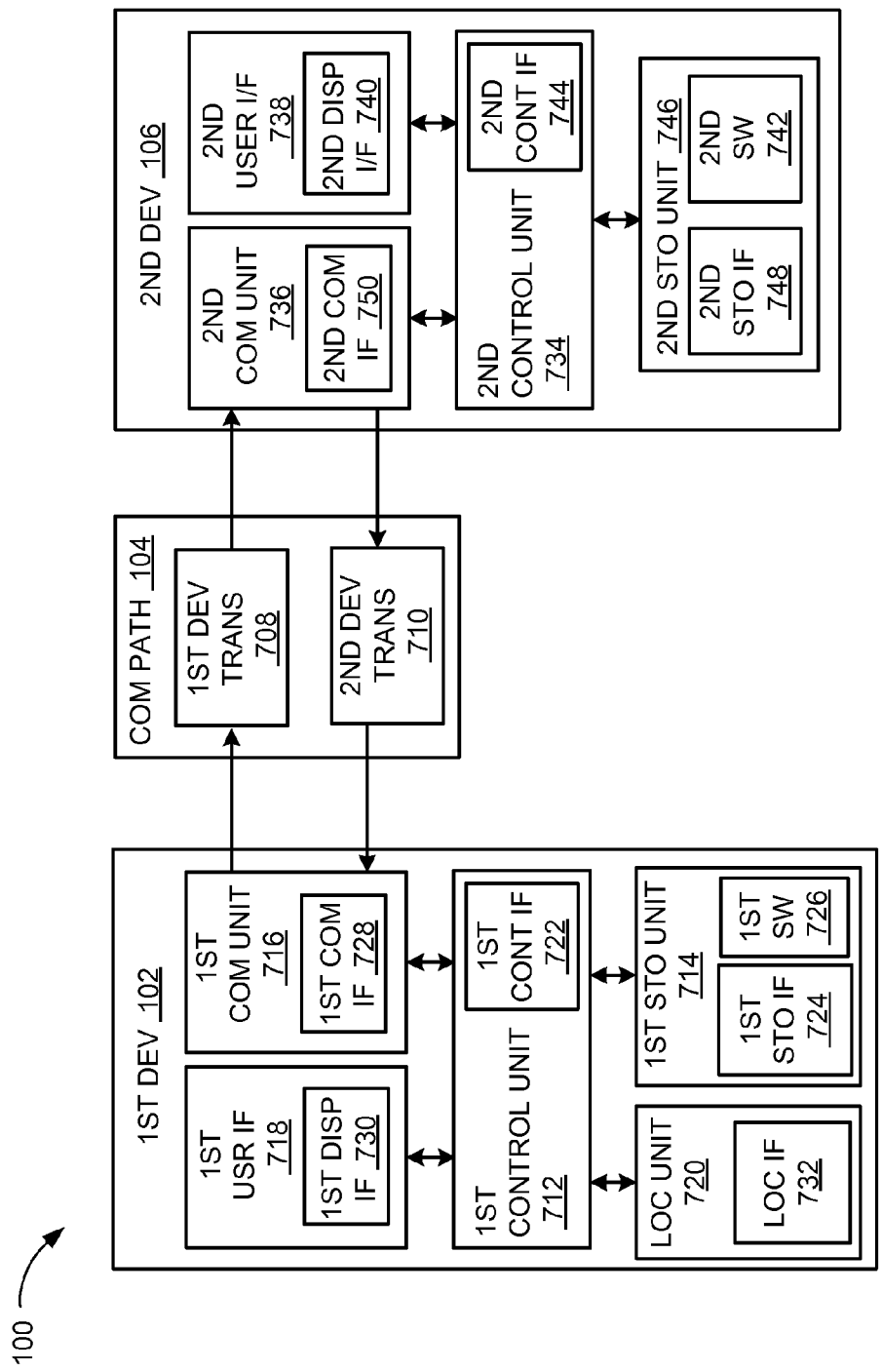
FIG. 7 is an exemplary block diagram of the computing system.

Referring now to FIG. 7, therein is shown an exemplary block diagram of the computing system 100. The computing system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the computing system 100 is shown with the first device 102 and the second device 106 as client devices, although it is understood that the computing system 100 can have the first device 102 and the second device 106 as different type of devices. For example, the first device 102, the second device 106, or a combination thereof can be a server having a display interface.

For brevity of description in this embodiment of the present invention, the first device 102 and the second device 106 will be described as client devices. The embodiment of the present invention is not limited to this selection for the type of devices. The selection is an example of an embodiment of the present invention.

The first device 102 can include a first control unit 712, a first storage unit 714, a first communication unit 716, and a first user interface 718, and a location unit 720. The first control unit 712 can include a first control interface 722. The first control unit 712 can execute a first software 726 to provide the intelligence of the computing system 100.

The first control unit 712 can be implemented in a number of different manners. For example, the first control unit 712 can be a processor, an application specific integrated circuit (ASIC), an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The first storage unit 714 can store the first software 726. The first storage unit 714 can also store the relevant information, such as data representing incoming images, data representing previously presented image, sound files, or a combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, the host device 108 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, an infrared sensor for receiving remote signals, or any combination thereof to provide data and communication inputs.

The first user interface 718 can include a graphics processing unit (GPU) and a first display interface 730. The first display interface 730 can include a display, a projector, a video screen, a speaker, or any combination thereof. The first display interface 730 can include the display interface 202 of FIG. 2.

The first control unit 712 can operate the first user interface 718 to display information generated by the computing system 100. The first control unit 712 can also execute the first software 726 for the other functions of the computing system 100, including receiving location information from the location unit 720. The first control unit 712 can further execute the first software 726 for interaction with the communication path 104 via the first communication unit 716.

The location unit 720 can generate location information, current heading, current acceleration, and current speed of the first device 102, as examples. The location unit 720 can be implemented in many ways. For example, the location unit 720 can function as at least a part of GPS, an inertial navigation system, a cellular-tower location system, a pressure location system, or any combination thereof. Also, for example, the location unit 620 can utilize components such as an accelerometer, a gyroscope, GPS receiver, or a combination thereof.

The location unit 720 can include a location interface 732. The location interface 732 can be used for communication between the location unit 720 and other functional units in the first device 102. The location interface 632 can also be used for communication external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control unit 712.

The second device 106 can be optimized for implementing an embodiment of the present invention in a multiple device embodiment with the first device 102. The second device 106 can provide the additional or higher performance processing power compared to the first device 102. The second device 106 can also provide optimized display interface compared to the first device 102, such as a bigger screen or a higher definition. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, touch screen, soft-keys, a keyboard, a microphone, or any combination thereof to provide data and communication inputs. Examples of the output device of the second user interface 738 can include a second graphics processing unit and a second display interface 740. The second display interface 740 can include a display, a projector, a video screen, a speaker, or any combination thereof. The second display interface 740 can also include the further display 204 of FIG. 2.

The second control unit 734 can execute a second software 742 to provide the intelligence of the second device 106 of the computing system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the computing system 100, including operating the second communication unit 736 to communicate with the first device 102, the host device 108, or a combination thereof over the communication path 104.

The second control unit 734 can be implemented in a number of different manners. For example, the second control unit 734 can be a processor, an application specific integrated circuit (ASIC), an embedded processor, a microprocessor, hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store relevant information, such as data representing incoming images, data representing previously presented image, sound files, or a combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the computing system 100 is shown with the second storage unit 746 as a single hierarchy storage system, although it is understood that the computing system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The computing system 100 can be executed by the first control unit 712, the second control unit 734, or a combination thereof.

The first device 102, the second device 106, or a combination thereof can similarly communicate and interact with the host device 108. Details for the host device 108 will be described below.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106, the host device 108, and the communication path 104.

The functional units in the second device 106 can work individually and independently of the other functional units. The second device 106 can work individually and independently from the first device 102, the host device 108, and the communication path 104.

For illustrative purposes, the computing system 100 is described by operation of the first device 102 and the second device 106. It is understood that the first device 102, the second device 106, and the host device 108 can operate any of the modules and functions of the computing system 100.

Figure 8:
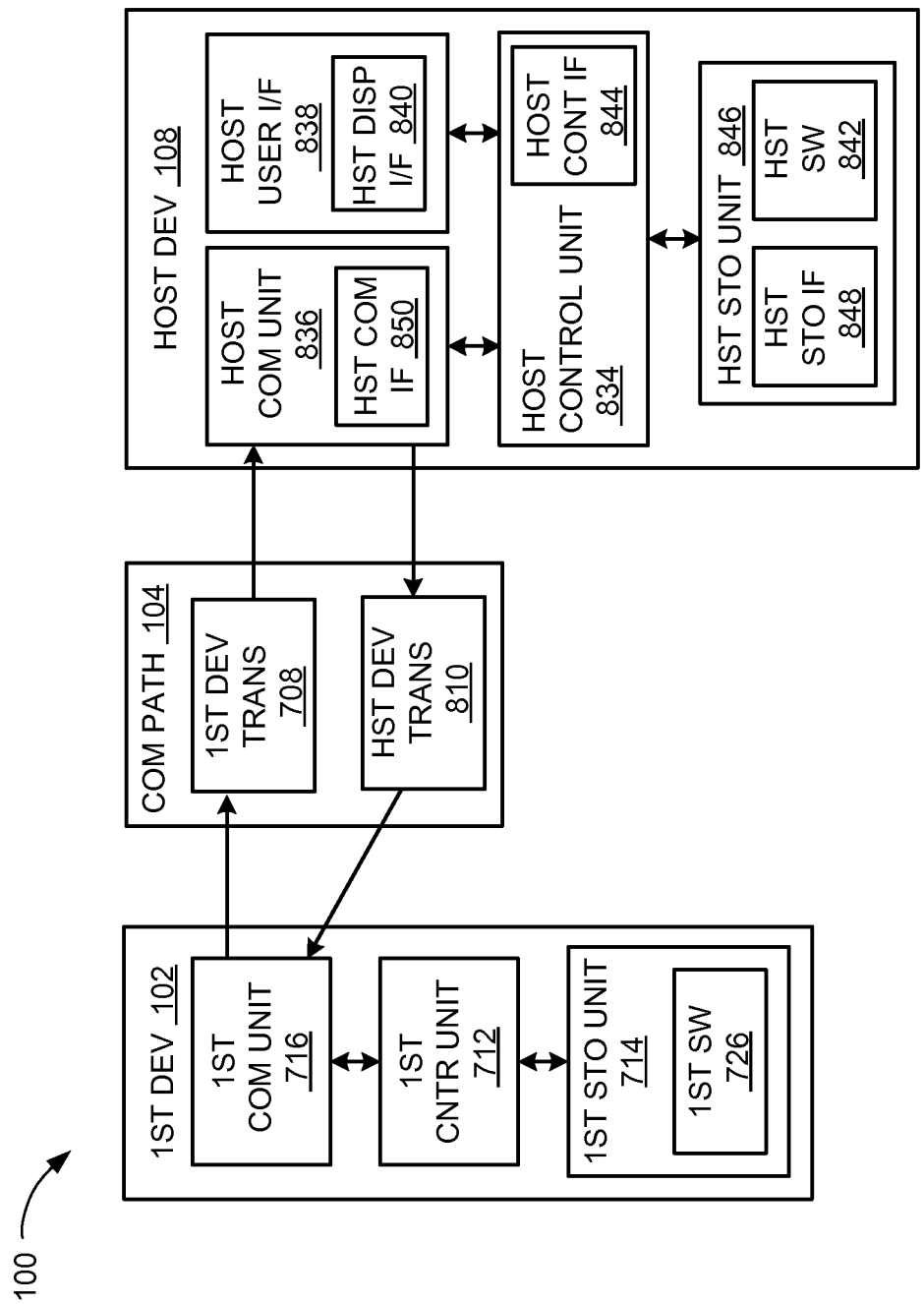
FIG. 8 is a further exemplary block diagram of the computing system.

Referring now to FIG. 8, therein is shown a further exemplary block diagram of the computing system 100. Along with the first device 102 and the second device 106 of FIG. 7, the computing system 100 can include the host device 106. The first device 102 can send information in the first device transmission over the communication path 104 to the host device 108. The host device 108 can send information in a host device transmission 810 over the communication path 104 to the first device 102.

For illustrative purposes, the computing system 100 is shown with the host device 108 as a server, although it is understood that the computing system 100 can have the host device 108 as a different type of device. For example, the host device 108 can be a client device.

Also for illustrative purposes, the computing system 100 is shown with the first device 102 communicating with the host device 108. However, it is understood that the second device 106 can also communicate with the host device 108 in a similar manner as the communication between the first device 102 and the host device 108, between the first device 102 and the second device 106, or a combination thereof.

For brevity of description in this embodiment of the present invention, the host device 108 will be described as a server device. The embodiment of the present invention is not limited to this selection for the type of devices. The selection is an example of an embodiment of the present invention.

The host device 108 can be optimized for implementing an embodiment of the present invention in a multiple device embodiment with the first device 102. The host device 108 can provide the additional or higher performance processing power compared to the first device 102, the second device 106, or a combination thereof. The host device 108 can include a host control unit 834, a host communication unit 836, and a host user interface 838.

The host user interface 838 allows a user (not shown) to interface and interact with the host device 108. The host user interface 838 can include an input device and an output device. Examples of the input device of the host user interface 838 can include a keypad, a touchpad, touch screen, soft-keys, a keyboard, a microphone, or any combination thereof to provide data and communication inputs. Examples of the output device of the host user interface 838 can include a host display interface 840. The host display interface 840 can include a display, a projector, a video screen, a speaker, or any combination thereof.

The host control unit 834 can execute a host software 842 to provide the intelligence of the host device 108 of the computing system 100. The host software 842 can operate in conjunction with the first software 726, the second software 742 of FIG. 7, or a combination thereof. The host control unit 834 can provide additional performance compared to the first control unit 712.

The host control unit 834 can operate the host user interface 838 to display information. The host control unit 834 can also execute the host software 842 for the other functions of the computing system 100, including operating the host communication unit 836 to communicate with the first device 102, the second device 106, or a combination thereof over the communication path 104.

The host control unit 834 can be implemented in a number of different manners. For example, the host control unit 834 can be a processor, an application specific integrated circuit (ASIC), an embedded processor, a microprocessor, hardware control logic, a hardware finite state machine (FSM), a digital signal processor (DSP), or a combination thereof.

The host control unit 834 can include a host controller interface 844. The host controller interface 844 can be used for communication between the host control unit 834 and other functional units in the host device 108. The host controller interface 844 can also be used for communication that is external to the host device 108.

The host controller interface 844 can receive information from the other functional units or from external sources, or can transmit information to the other functional units or to external destinations. The external sources and the external destinations refer to sources and destinations external to the host device 108.

The host controller interface 844 can be implemented in different ways and can include different implementations depending on which functional units or external units are being interfaced with the host controller interface 844. For example, the host controller interface 844 can be implemented with a pressure sensor, an inertial sensor, a microelectromechanical system (MEMS), optical circuitry, waveguides, wireless circuitry, wireline circuitry, or a combination thereof.

A host storage unit 846 can store the host software 842. The host storage unit 846 can also store the relevant information, such as data representing incoming images, data representing previously presented image, sound files, or a combination thereof. The host storage unit 846 can be sized to provide the additional storage capacity to supplement the first storage unit 714.

For illustrative purposes, the host storage unit 846 is shown as a single element, although it is understood that the host storage unit 846 can be a distribution of storage elements. Also for illustrative purposes, the computing system 100 is shown with the host storage unit 846 as a single hierarchy storage system, although it is understood that the computing system 100 can have the host storage unit 846 in a different configuration. For example, the host storage unit 846 can be formed with different storage technologies forming a memory hierarchal system including different levels of caching, main memory, rotating media, or off-line storage.

The host storage unit 846 can be a volatile memory, a nonvolatile memory, an internal memory, an external memory, or a combination thereof. For example, the host storage unit 846 can be a nonvolatile storage such as non-volatile random access memory (NVRAM), Flash memory, disk storage, or a volatile storage such as static random access memory (SRAM).

The host storage unit 846 can include a host storage interface 848. The host storage interface 848 can be used for communication between other functional units in the host device 108. The host storage interface 848 can also be used for communication that is external to the host device 108.

The host storage interface 848 can receive information from the other functional units or from external sources, or can transmit information to the other functional units or to external destinations. The external sources and the external destinations refer to sources and destinations external to the host device 108.

The host storage interface 848 can include different implementations depending on which functional units or external units are being interfaced with the host storage unit 846. The host storage interface 848 can be implemented with technologies and techniques similar to the implementation of the host controller interface 844.

The host communication unit 836 can enable external communication to and from the host device 108. For example, the host communication unit 836 can permit the host device 108 to communicate with the first device 102, the second device 106, or a combination thereof over the communication path 104.

The host communication unit 836 can also function as a communication hub allowing the host device 108 to function as part of the communication path 104 and not limited to be an end point or terminal unit to the communication path 104. The host communication unit 836 can include active and passive components, such as microelectronics or an antenna, for interaction with the communication path 104.

The host communication unit 836 can include a host communication interface 850. The host communication interface 850 can be used for communication between the host communication unit 836 and other functional units in the host device 108. The host communication interface 850 can receive information from the other functional units or can transmit information to the other functional units.

The host communication interface 850 can include different implementations depending on which functional units are being interfaced with the host communication unit 836. The host communication interface 850 can be implemented with technologies and techniques similar to the implementation of the host controller interface 844.

The first communication unit 716 can couple with the communication path 104 to send information to the host device 108 in the first device transmission 708. The host device 108 can receive information in the host communication unit 836 from the first device transmission 708 of the communication path 104.

The host communication unit 836 can couple with the communication path 104 to send information to the first device 102 in the host device transmission 810. The first device 102 can receive information in the first communication unit 716 from the host device transmission 810 of the communication path 104. The computing system 100 can be executed by the first control unit 712, the host control unit 834, or a combination thereof. The second device 106 can similarly communicate and interact with the host device 108 using the corresponding units and functions therein.

For illustrative purposes, the host device 108 is shown with the partition having the host user interface 838, the host storage unit 846, the host control unit 834, and the host communication unit 836, although it is understood that the host device 108 can have a different partition. For example, the host software 842 can be partitioned differently such that some or all of its function can be in the host control unit 834 and the host communication unit 836. Also, the host device 108 can include other functional units not shown in FIG. 8 for clarity.

The functional units in the host device 108 can work individually and independently of the other functional units. The host device 108 can work individually and independently from the first device 102, the second device 106, and the communication path 104.

For illustrative purposes, the computing system 100 is described by operation of the first device 102 and the host device 108. It is understood that the first device 102, the second device 106, and the host device 108 can operate any of the modules and functions of the computing system 100.

Figure 9:
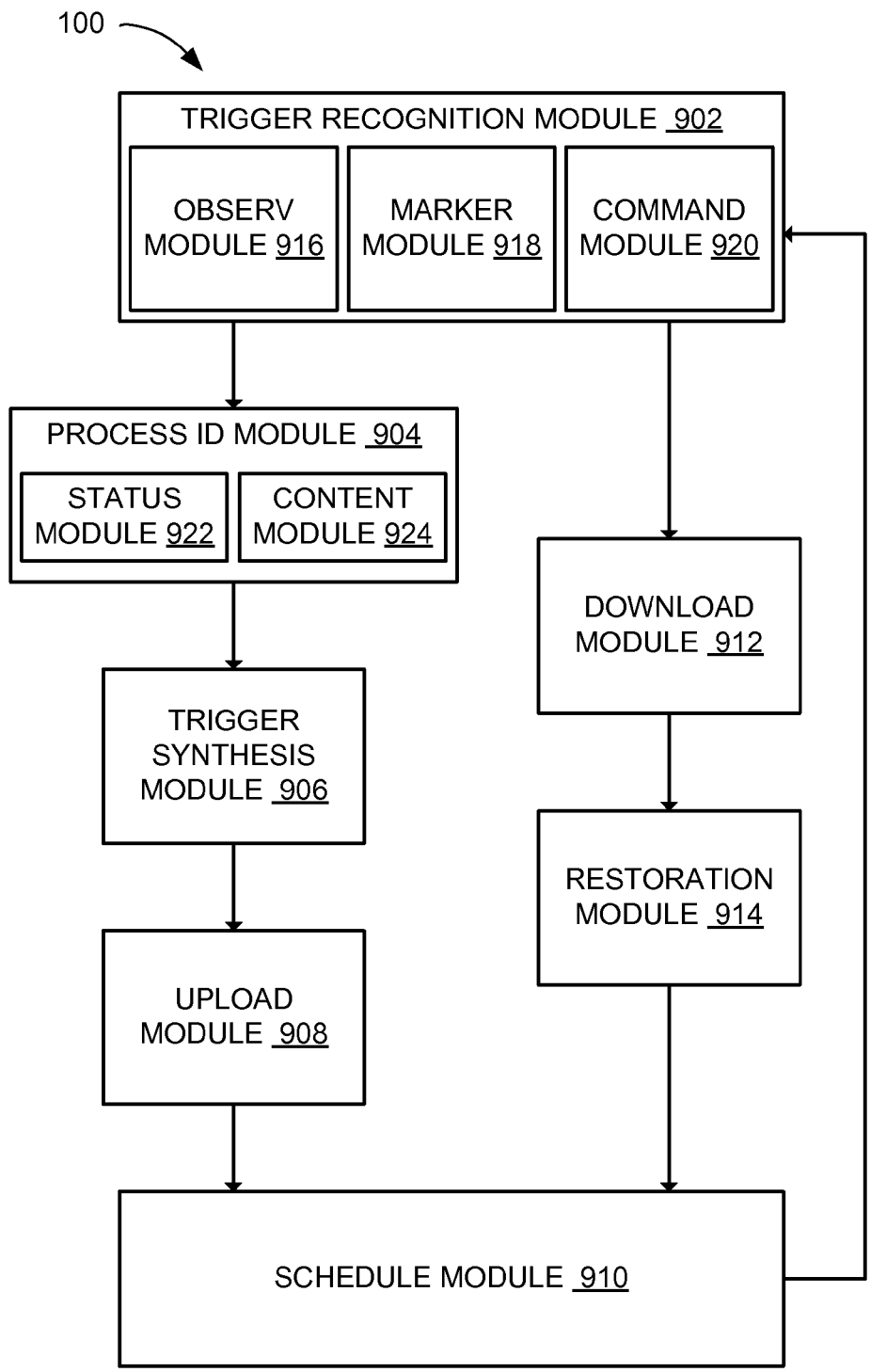
FIG. 9 is a control flow of the computing system.

Referring now to FIG. 9, therein is shown a control flow of the computing system 100. The computing system 100 can include a trigger recognition module 902, a process identification module 904, a trigger synthesis module 906, an upload module 908, a schedule module 910, a download module 912, and a restoration module 914.

The trigger recognition module 902 can be coupled to the process identification module 904 using wired or wireless connections, by having an output of one module as an input of the other module, by having operations of one module influence operation of the other module, or a combination thereof. Similarly, the process identification module 904 can be coupled to the trigger synthesis module 906 and the trigger synthesis module 906 can be coupled to the upload module 908. The upload module 908 can be similarly coupled to the schedule module 910.

The trigger recognition module 902 can also be coupled to the download module 912 in a manner similar to the coupling with the process identification module 904. The download module 912 can be further coupled in a manner described above to the restoration module 914, which can be coupled to the schedule module 910.

The trigger recognition module 902 is configured to initiate pause or continuation of the task 206 of FIG. 2. The trigger recognition module 902 can initiate a process for pausing or continuing the task 206 by detecting conditions or situations matching the transfer trigger 302 of FIG. 3.

For example, the trigger recognition module 902 can be configured to determine different aspects of the context 412 of FIG. 4 associated with the user or the task 206, with the context 412 based on the current time 404 of FIG. 4, the current location 406 of FIG. 4, the activity type 408 of FIG. 4, the activity participant 410 of FIG. 4, or a combination thereof. Also for example, the trigger recognition module 902 can detect and identify the available-device type 218 of FIG. 2, the available-device identification 216 of FIG. 2, or a combination thereof.

The trigger recognition module 902 can have an observation module 916, a marker module 918, and a command module 920 for detecting conditions or situations matching the transfer trigger 302. The observation module 916 is configured to detect conditions or situation with respect to the user. The observation module 916 can detect conditions or situations by using the first device 102 of FIG. 1 or the second device 106 of FIG. 2.

The observation module 916 can detect conditions or situations by detecting the current observation 402 of FIG. 4. For example, the observation module 916 can use the first user interface 718 of FIG. 7, the second user interface 738 of FIG. 7, the host user interface 838 of FIG. 8 or a combination thereof to set the current observation 402 as movements direction or patterns of the user, such as involving user's torso or hand, inputs or interactions from the user, images of surrounding environment, or a combination thereof. For a more specific example, the observation module 916 can use cameras or microphones to observe the user or the surrounding environment, or use input devices, such as keyboards or touch screens, to receive inputs or interactions from the user.

Also for example, the observation module 916 can detect the current location 406 using the navigation information from the location unit 720 of FIG. 7. The observation module 916 can further detect and determine the current time 404 by receiving clock signals with the first communication unit 716 of FIG. 7, the second communication unit 736 of FIG. 7, the host communication unit 836 of FIG. 8, or a combination thereof or by using the first control unit 712 of FIG. 7, the second control unit 734 of FIG. 7, the host control unit 834 of FIG. 8, or a combination thereof.

For further example, the observation module 916 can determine an activity of the user using the location unit 720, the first communication unit 716, the second communication unit 736, the host communication unit 836, the first control unit 712, the second control unit 734, the host control unit 834 or a combination thereof. For a more specific example, observation module 916 can use locational information, scheduling information, such as from the user's calendar or social networks, user's contacts, the user profile, or a combination thereof to determine the activity type 408, the activity participant 410, or a combination thereof associated with the user's current actions.

As another example, the observation module 916 can use the location unit 720, the first communication unit 716, the second communication unit 736, the host communication unit 836, or a combination thereof to determine the available-device type 218, the available-device identification 216, or a combination thereof. For a more specific example, the observation module 916 can be predetermined by the computing system 100 to detect, communicate, and identify various devices therein, such as the first device 102 and the second device 106, when the devices are within a set distance from each other. The observation module 916 can set the identification information as the available-device identification 216 and further use it to determine the available-device type 218.

The trigger recognition module 902 can use the current observation 402, the current time 404, the current location 406, the activity type 408, the activity participant 410, the available-device type 218, the available-device identification 216, or a combination thereof to determine the inference for the context 412. The trigger recognition module 902 can determine the inference for the context 412 by comparing the above described data against a table, using a method, or a combination thereof predetermined by the computing system 100.

The marker module 918 is configured to determine a user's movement. The marker module 918 can determine the user's movement by identifying the recognition marker 602 of FIG. 6.

The marker module 918 can identify the recognition marker 602 by identifying features of the user as predefined by the computing system 100. For example, the marker module 918 can match pixel patterns in images from the first user interface 718 to patterns for eyes, nose, face, shoulders, hips, any physical feature of the user, or a combination thereof as defined by the computing system 100.

The command module 920 is configured to initiate processes for pausing or continuing the task 206 based on the conditions or situations associated with the user. The command module 920 can initiate the processes for pausing the task 206 or the application 208 of FIG. 2 associated with the task 206 when the context 412 or the aspects of the context 412, such as the current location 406 or the activity participant 410, the current observation 402, the available-device identification 216, the available-device type 218, or a combination thereof matches the upload-trigger 304 of FIG. 3.

For example, the upload-trigger 304 can specify the context 412, the current observation 402, or a combination thereof representative of the user using the first device 102 having the first display interface 730 of FIG. 7 smaller than the second display interface 740 of FIG. 7 of the second device 106 or less battery life or capacity than the second device 106. The upload-trigger 304 can further have thresholds and limitations representing the user using the application 208 specified as involving reading and writing, such as accessing or sending an email. The upload-trigger 304 can further have thresholds and limitations requiring the first device 102 and the second device 106 to have common ownership, within a preset distance, relevant to certain instances of the context 412 or a combination thereof.

Also for example, the upload-trigger 304 can specify situation where the user commands a pause of the task 206. For a more specific example, the upload-trigger 304 can include situations or conditions where the user pauses a video clip being viewed or leaves the first device 102 unattended while performing the task 206 such that the device goes into sleep mode.

The command module 920 can compare the context 412, the current observation 402, or a combination thereof to the upload-trigger 304. The command module 920 can initiate the processes for pausing the task 206 and capturing the pause point 210 of FIG. 2 when the context 412, the current observation 402, or a combination thereof match a situation, a condition, or a combination thereof represented by the upload-trigger 304.

The command module 920 can also initiate the processes for pausing the task 206 based on commands given by the user through gestures. The command module 920 can recognize commands given through body movements by detecting the movement pattern 604 of FIG. 6 using the recognition marker 602. The command module 920 can detect the movement pattern 604 by tracking one or more instance of the recognition marker 602 over a duration.

For example, the command module 920 can use the first control unit 712, the second control unit 734, the host control unit 834, or a combination thereof to determine a vector or a series of vectors between the recognition marker 602 in one image and the recognition marker 602 in a subsequent image. The command module 920 can set the movement pattern 604 as one or more vectors corresponding to one or more instances of the recognition marker 602, a sequence of vectors corresponding to one or more instance of the recognition marker 602 across sequential images taken over a duration of time, or a combination thereof.

The command module 920 can compare the movement pattern 604, the recognition marker 602, or a combination thereof to the command-motion profile 606 of FIG. 6. The command module 920 can identify the movement pattern 604, the recognition marker 602, or a combination thereof as a command from the user to initiate processes for pausing the task 206 when the movement pattern 604, the recognition marker 602, or a combination thereof matches a corresponding portion in the command-motion profile 606.

The command module 920 can initiate processes by passing the control flow to a different module. The command module 920 can initiate a pause by passing the control flow to the process identification module 904. The command module 920 can initiate continuance by passing the control flow to the download module 912. Details regarding the continuance will be described below.

After detecting conditions or situations relative to the user, the control flow can pass from the trigger recognition module 902 to the process identification module 904 for pausing the task 206. The control flow can pass by having the context 412, the available-device identification 216, the available-device type 218, or a combination thereof as an output from the trigger recognition module 902 to the process identification module 904, storing the context 412, the available-device identification 216, the available-device type 218, or a combination thereof at a location known and accessible to the process identification module 904, by notifying the process identification module 904, such as by using a flag, an interrupt, a status signal, or a combination thereof, or a combination of processes thereof.

The process identification module 904 is configured to determine a current status of the task 206. The process identification module 904 can determine states, processes, data, or a combination thereof associated with the task 206 with respect to the first device 102 of FIG. 1, the second device 106 of FIG. 1, the host device 108 of FIG. 1, or a combination thereof. The process identification module 904 can have a status module 922 and a content module 924 for determining the current status of the task 206.

The status module 922 configured to determine a current status of the processes in progress for performing the task 206. The status module 922 can determine the current status of the processes by capturing the pause point 210 in processing the task 206. The status module 922 can capture the pause point 210 by determining the process profile 212 of FIG. 2 associated with the processes or the statuses thereof corresponding to the pause point 210.

The status module 922 can be configured to determine the process profile 212 based on the upload-trigger 304 corresponding to the current observation 402, the context 412, the available-device type 218, or a combination thereof. The status module 922 can determine the process profile 212 when the current observation 402, the context 412, the available-device type 218, or a combination thereof matches the upload-trigger 304 as determined by the trigger recognition module 902.

The status module 922 can determine the process profile 212 by assigning process parameters, such as identification or state information, for various processes, one or more instances of the application 208, or a combination thereof to the process profile 212. The status module 922 can determine the process profile 212 using the process parameters that are current for the first device 102, the second device 106, the host device 108, or a combination thereof to capture the pause point 210. The status module 922 can further determine the process profile 212 using the process parameters that are associated with the task 206, the context 412, the upload-trigger 304, or a combination thereof.

The status module 922 can further determine the process profile 212 to include memory addresses or locators corresponding to the processes or instances of the application 208 currently executing on the first device 102, the second device 106, the host device 108, or a combination thereof. For example, the process profile 212 can include the address or location of code or file serving as the source of instructions for carrying out the current process or application.

The status module 922 can further determine the process profile 212 to include accessible or allotted memory location, dynamically allocated memory location, or a combination thereof associated with the various processes, the instances of the application 208, or a combination thereof. For example, the process profile 212 can include the address or location of input data, global variable, local variable, output data, intermediate data, or a combination thereof associated with the processes or instances of the application 208 executing at the pause point 210.

The status module 922 can use the first control interface 722 of FIG. 7, the first storage interface 724 of FIG. 7, the second control interface 744 of FIG. 7, the second storage interface 748 of FIG. 7, the host control interface 844 of FIG. 8, the host storage interface 848 of FIG. 8, or a combination thereof to determine the process profile 212.

The status module 922 can store the process profile 212 in the first storage unit 714 of FIG. 7, the second storage unit 746 of FIG. 7, the host storage unit 846 of FIG. 8, or a combination thereof.

For example, the status module 922 can capture of the pause point 210 by determining the process profile 212 to include one or more instances of the application 208, various processes, or a combination thereof that the user is accessing on the first device 102. The status module 922 can include the processes or portions of the application 208 interacting with the second device 106, the host device 108, or a combination thereof. The status module 922 can store the process profile 212 in the first device 102.

The content module 924 is configured to identify data corresponding to the process profile 212 to capture the pause point 210. The content module 924 can identify data corresponding to the process profile 212 by identifying the process content 214 of FIG. 2 for capturing the pause point 210. The content module 924 can be configured to identify the process content 214 based on the upload-trigger 304 corresponding to the context 412, the available-device type 218, or a combination thereof as determined by the trigger recognition module 902.

The content module 924 can identify the process content 214 by determining the value stored at one or more memory locations corresponding to the process profile 212. The content module 924 can assign the value stored at the memory location, including accessible or allotted memory location, dynamically allocated memory location, or a combination thereof, specified by the process profile 212 as the process content 214. The content module 924 can identify the process content 214 to include a structure or a link to corresponding portions in the process profile 212, such as the address or location corresponding to the data.

For example, the content module 924 can assign the value representing input data, global variable, local variable, output data, intermediate data, or a combination thereof at an address or location specified by the process profile 212 as the process content 214. Also for example, the content module 924 can include identified data, determined data, received data, calculated data, generated data, displayed data, or a combination thereof in the process content 214. For further example, the content module 924 can exclude instruction data, method data, or a combination thereof associated with carrying out the task 206 in the process content 214.

The content module 924 can use the first control interface 722, the first storage interface 724, the second control interface 744, the second storage interface 748, the host control interface 844, the host storage interface 848, or a combination thereof to identify the process content 214. The content module 924 can be configured to store the process content 214 in the first storage unit 714, the second storage unit 746, the host storage unit 846, or a combination thereof.

After determining the process profile 212 and identifying the process content 214, the control flow can pass from the process identification module 904 to the trigger synthesis module 906. The control flow can pass similarly as described above between the trigger recognition module 802 and the process identification module 904.

The trigger synthesis module 906 is configured to determine a condition, a situation, or a combination thereof for resuming the task 206. The trigger synthesis module 906 can determine the condition, the situation, or a combination thereof for resuming the task 206 by generating the resumption-trigger 306 of FIG. 3.

The trigger synthesis module 906 can be configured to generate the resumption-trigger 306 based on the upload-trigger 304 matching the context 412, the available-device type 218, the current observation 402, or a combination thereof as determined by the trigger recognition module 902.

For example, the trigger synthesis module 906 can generate the resumption-trigger based on comparing and matching the command-motion profile 606 to the movement pattern 604. Also for example, the trigger synthesis module 906 can generate the resumption-trigger 306 based on the available-device type 218 having a larger display, stronger processing power, or a combination thereof than the first device 102.

The trigger synthesis module 906 can generate the resumption-trigger 306 when the trigger recognition module 902 determines conditions for pausing and storing the progress of the task 206. The trigger synthesis module 906 can generate the resumption-trigger 306 specifically contemporaneous to when storing progress of the task 206, such as the process profile 212 and the process content 214, for capturing the pause point 210. The computing system 100 can use the resumption-trigger 306 to resume the task 206 at a later time using any of the devices within the computing system 100.

For example, the user can be using the first device 102 to perform the task 206 of sending an email. The upload-trigger 304 can include the context 412 of writing emails and the available-device identification 216 having a display interface larger than that of the first device 102, a larger input mechanism, such as a keyboard, or a combination thereof. The upload-trigger 304 can further require the first device 102 to be within a set distance from the second device 106.

Continuing with the example, the trigger synthesis module 906 can process necessary information to generate the resumption-trigger 306 when the trigger recognition module 902 recognizes that the condition, the situation, or a combination thereof in the upload-trigger 304 is met. The trigger synthesis module 906 can generate the resumption-trigger 306 to continue the task 206 on the second device 106 to provide the user with bigger display screens, convenient input mechanism, or a combination thereof.

The data representing the capture of the pause point 210, such as the process profile 212 or the process content 214, can be stored contemporaneously with the generation of the resumption-trigger 306 for resuming the task 206 at a later time using any of the devices in the computing system 100. Details regarding the storing and resuming the task 206 will be described below.

It has been discovered that the resumption-trigger 306 generated contemporaneously with capturing and storing the pause point 210 based on the upload-trigger 304 provides increased usability and relevant functionality. The resumption-trigger 306 generated contemporaneously with capturing storing the pause point 210 provides the increased usability and relevant functionality by allowing the user to tailor resumption of the task 206 based on situation or need instead of being limited to a preset parameter.

The trigger synthesis module 906 can generate the resumption-trigger 306 using the trigger designation panel 318 of FIG. 3. The trigger synthesis module 906 can also use the upload-trigger 304, the current observation 402, the context 412, the device-set 312 of FIG. 3, groupings of people designated for accessing the task 206, or a combination thereof to generate the resumption-trigger 306.

For example, the trigger synthesis module 906 can generate the resumption-trigger 306 to immediately continue the task 206 on the second device 106 when the upload-trigger 304 specifies situations corresponding to bigger screens or convenient input device being available on the second device 106. The trigger synthesis module 906 can generate the resumption-trigger 306 to include values or indications for activating and unlocking the second device 106, transferring information regarding the pause point 210 directly from the first device 102 to second device 106 or through the host device 108 without delay, without processing the task 206 in the task queue 502 of FIG. 5, or a combination thereof.

Also for example, the trigger synthesis module 906 can use the trigger designation panel 318 to interact with the user and receive selections specifying the context 412, the current observation 402, personal preferences, limitations, or a combination thereof for the resumption-trigger 306. The trigger synthesis module 906 can set the received data as the resumption-trigger 306 to correspond to the context 412, the current observation 402, or various other factors to initiate continuation of the task 206.

Continuing with the example, the trigger synthesis module 906 can generate the resumption-trigger 306 by identifying a parameter or a factor representing the received selections and including them in the resumption-trigger 306. The trigger synthesis module 906 can further join multiple parameters or factors using logical operators, such as "AND" or "IF-THEN".

For further example, the trigger synthesis module 906 can generate the resumption-trigger 306 based on license expiration date, deadlines or priorities from user's calendar, other scheduled events, or a combination thereof. The trigger synthesis module 906 can set the trigger-limitation 308 of FIG. 3 of time limit or duration for completing the task 206 or a corresponding priority level as the determined scheduling limitation.

It has been discovered that the resumption-trigger 306 including the context 412 having the current time 404, the activity type 408, the activity participant 410, or a combination thereof provides increased usability and flexibility. It has also been discovered that the resumption-trigger 306 including the available-device identification 216 or the available-device type 218 provides increased usability and flexibility. The resumption-trigger 306 including the context 412 or device information can be tailored for situations and needs of the user rather than relying on a preset limitation for pausing or continuing the task 206.

It has also been discovered that the resumption-trigger 306 generated contemporaneously with capturing or storing the pause point 210 provides detailed and relevant limitations for continuing the task 206. The resumption-trigger 306 can be based on updated and current data known to the user, the computing system 100, or a combination thereof.

The trigger synthesis module 906 can use the first control unit 712, the second control unit 734, the host control unit 834, the first user interface 718, the second user interface 738, the host user interface 848, or a combination thereof to generate the transfer trigger 302. The trigger synthesis module 906 can store the transfer trigger 302 in the first storage unit 714, the second storage unit 746, the host storage unit 846, or a combination thereof.

After generating the transfer trigger 302, the control flow can pass from the trigger synthesis module 906 to the upload module 908. The control flow can pass similarly as described above between the trigger recognition module 902 and the process identification module 904.

The upload module 908 is configured to transfer the pause point 210 for continuing the task 206 at a later time, using a different device, or a combination thereof. The upload module 908 can transfer the pause point 210 by communicating the pause point 210 between, storing the pause point 210 in, or a combination of processes thereof regarding the first device 102, the second device 106, the host device 108, or a combination thereof.

The upload module 908 can be configured to store the process profile 212, the process content 214, the transfer trigger 302, usage or access data, or a combination thereof in the first storage unit 714, the second storage unit 746, the host storage unit 846, or a combination thereof. The upload module 908 can further transfer the pause point 210 using the first communication unit 716, the second communication unit 736, the host communication unit 836, or a combination thereof to communicate and move the process profile 212, the process content 214, the transfer trigger 302, usage or access data, or a combination thereof between the devices.

The upload module 908 can transfer the captured instance of the pause point 210 contemporaneously with generation of the transfer trigger 302, based on satisfying the upload-trigger 304. Thus, the upload module 908 can transfer the captured instance of the pause point 210 based on the current observation 402, the context 412, user interaction, or a combination thereof.

The upload module 908 can update the process profile 212, the process content 214, the transfer trigger 302, usage or access data, or a combination thereof if the same instance of the task 206 has been paused before. The upload module 908 can update by storing the information in order, with a distinction for newest information, overwriting, or a combination of processes thereof relative to the previously stored instance of the data.

After transferring the process profile 212, the process content 214, the transfer trigger 302, usage or access data, or a combination thereof, the control flow can pass from the upload module 908 to the schedule module 910. The control flow can pass similarly as described above between the trigger recognition module 802 and the process identification module 904.

The schedule module 910 is configured to manage the task queue 502 including the task 206 for resuming the task 206 from the pause point 210. The schedule module 910 can access all instances of the task 206 stored in the first storage unit 714, the second storage unit 746, the host storage unit 846, or a combination thereof associated with the user. The schedule module 910 can manage the task queue 502 by displaying various instances of the task 206 using the first user interface 718, the second user interface 738, the host user interface 738, or a combination thereof.

The schedule module 910 can display the instances of the task 206 based on the context 412, a relevant order, based on priority, or a combination thereof. For example, the schedule module 910 can display only instances of the task 206 relevant to work when the context 412 for the user is related to work. Also for example, the task 206 can be arranged and organized based on time of pausing or scheduled time for resuming, by device previously accessing the task 206 or scheduled to resume the task 206, by priority levels, or a combination thereof.

The schedule module 910 can use colors, intensity, shape, clarity, size, or a combination thereof to manage the task queue 502. For example, the schedule module 910 can indicate a priority of the task 206 using a color scheme associated with a visual representation of the task 206. Also for example, the schedule module 910 can dim, blur, shrink, vibrate, or a combination of processes thereof for the displayed representation of the task 206 to distinguish unavailable or inappropriate, such as based on privacy or contextual issue, instances of the task 206 in the task queue 502.

The schedule module 910 can manage the task queue 502 by notifying the user. For example, the schedule module 910 can generate reminders or notices to the user based on scheduled times for the task 206 according to the task queue 502, the trigger-limitation 308 associated with the task 206, or a combination thereof.

The schedule module 910 can further interact with the user to schedule the task 206 in the task queue 502. The schedule module 910 can receive inputs from the user, such as moving the task 206 to another day in a calendar presentation of the task queue 502 or change in priority level, and adjust the resumption-trigger 306 for the task 206 accordingly. The schedule module 910 can use processes similar to generating the resumption-trigger 306 described above to adjust the resumption-trigger 306.

The schedule module 910 can further manage the task queue 502 using the queue-configuration panel 504 of FIG. 5. The schedule module 910 can display and interact with the user through the queue-configuration panel 504 using the first display interface 718, the second display interface 738, the host display interface 838, or a combination thereof. The schedule module 910 can receive the selections and filter, search, arrange, display, adjust, schedule, or a combination of processes thereof for the task queue 502.

The schedule module 910 can further use the first control unit 712, the second control unit 734, the host control unit 834, or a combination thereof to manage the task queue 502. The schedule module 910 can store the task queue 502 in the first storage unit 714, the second storage unit 746, the host storage unit 846, or a combination thereof.

It has been discovered that the task queue 502 provides ability to track daily activity and manage unfinished activity for the user. The task queue 502 can track when the task 206 was last accessed and paused and show the user where the user stopped during the previous session regardless of which device the user is currently accessing or previously used to perform a portion of the task. The task queue 502 can be further used to schedule, search for, filter, or a combination of processes thereof for unfinished instances of the task 206.

After managing the task queue 502, the control flow can pass from the schedule module 910 to the trigger recognition module 902. The control flow can pass similarly as described above between the trigger recognition module 802 and the process identification module 904.

The trigger recognition module 902 can further initiate processes for resuming the task 206. The trigger recognition module 902 can use the observation module 916, the marker module 918, the command module 920, or a combination thereof and processes described above to compare the current observation 402, the context 412, the task queue 502, the recognition marker 602, the movement pattern 604, the command-motion profile 606, or a combination thereof to the resumption-trigger 306, the trigger-limitation 308, the task-share group 310 of FIG. 3, or a combination thereof. The command module 920 can initiate continuance by passing the control flow to the download module 912.

After determining a match for the resumption-trigger, the control flow can pass from the trigger recognition module 902 to the download module 912 instead of the process identification module 904. The control flow can pass similarly as described above between the trigger recognition module 802 and the process identification module 904.

The download module 912 is configured to access the information regarding the pause point 210 for resuming the task 206. The download module 912 can use the first control interface 722, the second control interface 744, the host control interface 844, or a combination thereof to access the stored instance of the process profile 212, the process content 214, or a combination thereof.

The download module 912 can use the first communication unit 716, the second communication unit 736, the host communication unit 836, or a combination thereof to transfer the process profile 212, the process content 214, or a combination thereof between devices. For example, the download module 912 can access the information regarding the pause point 210 stored at a server from a phone or a laptop to continue the task 206 from the phone or the laptop. Also for example, the download module 912 can access the information regarding the pause point 210 stored at a workstation from a tablet for continuing the task 206 from the tablet.

The download module 912 can store the information regarding the pause point 210 on the device the user is using or is scheduled to use. The download module 912 can store the process profile 212, the process content 214, or a combination thereof in the first storage unit 714, the second storage unit 746, the host storage unit 846, or a combination thereof corresponding to the device being used by the user or scheduled for use based on the task queue 502.

After accessing and storing the information regarding the pause point 210, the control flow can pass from the download module 912 to the restoration module 914. The control flow can pass similarly as described above between the trigger recognition module 802 and the process identification module 904.

The restoration module 914 is configured to restore the pause point 210 on the device the user is using to continue the task 206. The restoration module 914 can be based on the resumption-trigger 306 as determined by the trigger recognition module 902. The restoration module 914 can further restore the pause point 210 on the device the user is using regardless of which device was previously used to access the task 206.

For example, the task 206 of watching a video clip for work can be initiated or directly sent to the task queue 502 of the user from a device, such as a work station or a projector, used by a presenter for a meeting or the user's superior. The user can view the task 206 of watching the video clip from the user's phone and designate a different device for performing the task 206 at a later time through the task queue 502. The restoration module 914 can store the contents of the video, loaded to where the user stopped watching or where the presenter was referencing, the video settings, or a combination thereof on the different device before the designated later time.

Also for example, the user can pause the task 206 of viewing pictures over the internet using a smart phone due to slow communication speeds. The pause point 210 can be stored in a web server, a service provider, the smart phone, or a combination thereof and represented in the task queue 502. The user can access the task queue 502 or the previous website from a computer at home at a later time. The restoration module 914 can load the website, webpage, the viewing history, user logging information, or a combination thereof to recreate the pause point 210 on the home computer to resume the task 206.

The restoration module 914 can use the first control unit 712, the second control unit 734, the host control unit 834, or a combination thereof to load the process instructions, acquire the memory locations, form data structures, or a combination thereof to load and recreate the process profile 212 in the device being used by the user and continue the task 206. The restoration module 914 further uses the first control unit 712, the second control unit 734, the host control unit 834, or a combination thereof to access and further process the process content 214 to continue the task 206.

For example, the user can take a picture of an item for considering before buying the item. The user can set the resumption-trigger 306 to display the picture from the user's television at home. The restoration module 914 can load and display the picture when the user arrives at home and turns on the television. The restoration module 914 can further load a website for buying the item to continue the task 206.

After restoring the pause point 210, resuming the task 206 or a combination thereof, the control flow can pass from the restoration module 914 to the schedule module 910. The control flow can pass similarly as described above between the trigger recognition module 802 and the process identification module 904.

The schedule module 910 can update the task queue 502 to reflect the access and updates to the task 206 as described above. The schedule module 910 can further store the updated task queue 502 in the first device, the second device 106, the host device 108, or a combination thereof.

It has been discovered that the process profile 212, the process content 214, and the transfer trigger 302 allow for increased usability and simplicity to the user. The process profile 212, the process content 214, and the transfer trigger 302 can be used to eliminate manually specifying intermediate storage and manually accessing and recreating the intermediately stored information.

It has also been discovered that the process profile 212, the process content 214, the task-share group 310, and the transfer trigger 302 allow for seamless integration between multiple users and multiple devices. The task-share group 310 can allow access to a group of people specified therein while the process profile 212, the process content 214, and the transfer trigger 302 allow for access, continuation, and update of the task 206 from any device allowed by the transfer trigger 302.

The computing system 100 has been described with module functions or order as an example. The computing system 100 can partition the modules differently or order the modules differently. For example, functions of the trigger synthesis module 906 and the upload module 908 or the function of the trigger recognition module 902 and the schedule module 910 can be combined. Also for example, the process identification module 904 can execute parallel to or after the trigger synthesis module 906.

The modules described in this application can be hardware implementation or hardware accelerators having active circuitry, passive circuitry, or a combination thereof in the first control unit 716 of FIG. 7 or in the second control unit 738 of FIG. 7. The modules can also be hardware implementation or hardware accelerators having active circuitry, passive circuitry, or a combination thereof within the first device 102 or the second device 106 but outside of the first control unit 716 or the second control unit 738, respectively.

The physical transformation from the pause point 210 captured by the process profile 212 and the process content 214 results in the movement in the physical world, such as the user performing other instance of the task 206. Movement in the physical world results in changes to the task queue 502 by user performing other instances of the task 206.

Also, the physical transformation from the transfer trigger 302 results in movement in the physical world, such as devices pausing or continuing processing of the task 206 for the user. Movement in the physical world results in changes to the pause point 210, the context 412 and the current observation 402, which can further be captured by updates to the transfer trigger 302.

Figure 10:
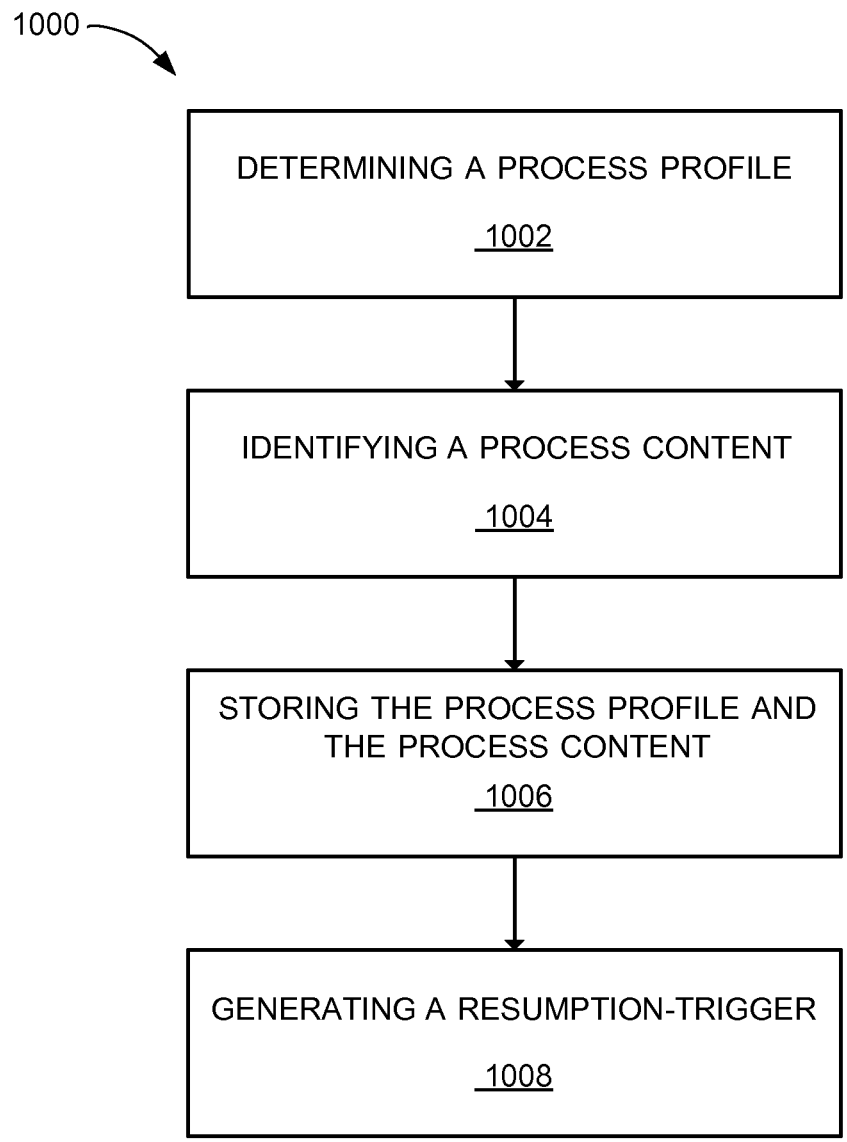
FIG. 10 is a flow chart of a method of operation of a computing system in an embodiment of the present invention.

Referring now to FIG. 10, therein is shown a flow chart of a method 1000 of operation of a computing system 100 in an embodiment of the present invention. The method 1000 includes: determining a process profile for capturing a pause point in processing a task in a block 1002; identifying a process content for capturing the pause point in a block 1004; storing the process profile and the process content in a block 1006; and generating a resumption-trigger with a control unit when storing the process profile and the process content for resuming the task from the pause point and for displaying on a device in a block 1008.

It has been discovered that the process profile 212 of FIG. 2, the process content 214 of FIG. 2, the task-share group 310 of FIG. 3, and the transfer trigger 302 of FIG. 3 allow for seamless integration between multiple users, multiple devices, or a combination thereof. The task-share group 310 can allow access to a group of people specified therein while the process profile 212, the process content 214, and the transfer trigger 302 allow for access, continuation, and update of the task 206 of FIG. 2 from any device allowed by the transfer trigger 302.

It has also been discovered that the task queue 502 of FIG. 5 provides ability to track daily activity and manage unfinished activity for the user. The task queue 502 can track when the task 206 was last accessed and paused and show the user where the user stopped during the previous session regardless of which device the user is currently accessing or previously used to perform a portion of the task. The task queue 502 can be further used to schedule, search for, filter, or a combination of processes thereof for unfinished instances of the task 206.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control unit, including a processor, configured to:
   determine a process profile for capturing a pause point in processing a task;
   identify a process content for capturing the pause point; and
a storage unit, coupled to the control unit, configured to store the process profile and the process content;
wherein:
the control unit is further configured to generate a resumption-trigger, including a trigger-limitation as a remaining duration of a license for an application associated with the task, according to a priority level of the task based on storing the process profile and the process content for resuming the task from the pause point and for displaying on a device.

2. The system as claimed in claim 1 wherein the control unit is further configured to:
determine a context associated with the task, with the context based on a current time, an activity type, an activity participant, or a combination thereof;
determine the process profile based on an upload-trigger corresponding to the context; and
generate the resumption-trigger based on the context.

3. The system as claimed in claim 1 wherein the control unit is further configured to:
determine the process profile based on an upload-trigger corresponding to an available-device type; and
generate the resumption-trigger based on the available-device type.

4. The system as claimed in claim 1 wherein the control unit is configured to generate the resumption-trigger including the trigger-limitation for resuming the task.

5. The system as claimed in claim 1 wherein the control unit is further configured to:
identify a recognition marker for identifying user's movement;
detect a movement pattern using the recognition marker; and
generate the resumption-trigger based on comparing a command-motion profile to the movement pattern.

6. The system as claimed in claim 1 wherein the control unit is further configured to manage a task queue including the task for resuming the task from the pause point and for displaying on the device.

7. The system as claimed in claim 1 wherein the storage unit is configured to update the process profile and the process content from previous instances based on resuming the task from a previous instance of the pause point.

8. The system as claimed in claim 1 wherein the control unit is configured to generate the resumption-trigger corresponding to a context based on a current time, an activity type, an activity participant, or a combination thereof.

9. The system as claimed in claim 1 wherein the control unit is configured to generate the resumption-trigger corresponding to an available-device type.

10. The system as claimed in claim 1 wherein the control unit is further configured to restore the pause point on a further device based on the resumption-trigger for continuing the task initiated by the device.

11. A method of operation of a computing system comprising:
determining a process profile for capturing a pause point in processing a task;
identifying a process content for capturing the pause point;
storing the process profile and the process content; and
generating a resumption trigger, including a trigger-limitation as a remaining duration of a license for an application associated with the task with a control unit according to a priority level of the task based on storing the process profile and the process content for resuming the task from the pause point and for displaying on a device.

12. The method as claimed in claim 11 further comprising:
determining a context associated with the task, with the context based on a current time, an activity type, an activity participant, or a combination thereof;
wherein:
determining the process profile includes determining the process profile based on an upload-trigger corresponding to the context; and
generating the resumption-trigger includes generating the resumption-trigger based on the context.

13. The method as claimed in claim 11 wherein:
determining the process profile includes determining the process profile based on an upload-trigger corresponding to an available-device type; and
generating the resumption-trigger includes generating the resumption-trigger based on the available-device type.

14. The method as claimed in claim 11 wherein generating the resumption-trigger includes generating the resumption-trigger including the trigger-limitation for resuming the task.

15. The method as claimed in claim 11 further comprising:
identifying a recognition marker for identifying user's movement;
detecting a movement pattern using the recognition marker; and
wherein:
generating the resumption-trigger includes generating the resumption-trigger based on comparing a command-motion profile to the movement pattern.

16. A non-transitory computer readable medium including instructions for execution with one or more processors to perform operations, the instructions comprising:
determining a process profile for capturing a pause point in processing a task;
identifying a process content for capturing the pause point;
storing the process profile and the process content; and
generating a resumption trigger, including a trigger-limitation as a remaining duration of a license for an application associated with the task, with a control unit with a priority level of the task based on storing the process profile and the process content for the task from the pause point and for displaying on a device.

17. The non-transitory computer readable medium as claimed in claim 16, the instructions further comprising:
determining a context associated with the task, with the context based on a current time, an activity type, an activity participant, or a combination thereof;
wherein:
determining the process profile includes determining the process profile based on an upload-trigger corresponding to the context; and
generating the resumption-trigger includes generating the resumption-trigger based on the context.

18. The non-transitory computer readable medium as claimed in claim 16 wherein:
determining the process profile includes determining the process profile based on an upload-trigger corresponding to an available-device type; and
generating the resumption-trigger includes generating the resumption-trigger based on the available-device type.

19. The non-transitory computer readable medium as claimed in claim 16 wherein generating the resumption-trigger includes generating the resumption-trigger including the trigger-limitation for resuming the task.

20. The non-transitory computer readable medium as claimed in claim 16, the instructions further comprising:

identifying a recognition marker for identifying user's movement;

detecting a movement pattern using the recognition marker; and wherein:

generating the resumption-trigger includes generating the resumption-trigger based on comparing a command-motion profile to the movement pattern.

\* \* \* \* \*